(12) United States Patent
Chen

(10) Patent No.: US 12,097,690 B2
(45) Date of Patent: Sep. 24, 2024

(54) PREHEATING-FREE LAMINATOR FOR IMPROVING THE QUALITY OF LAMINATION

(71) Applicant: BONSEN ELECTRONICS LIMITED, Guangdong (CN)

(72) Inventor: Wenhui Chen, Dongguan (CN)

(73) Assignee: BONSEN ELECTRONICS LIMITED, Dongguan (CN)

( * ) Notice: Subject to any disclaimer, the term of this patent is extended or adjusted under 35 U.S.C. 154(b) by 0 days.

(21) Appl. No.: 17/636,132

(22) PCT Filed: Aug. 10, 2021

(86) PCT No.: PCT/CN2021/111806
§ 371 (c)(1),
(2) Date: Feb. 17, 2022

(87) PCT Pub. No.: WO2023/010597
PCT Pub. Date: Feb. 9, 2023

(65) Prior Publication Data
US 2024/0157692 A1 May 16, 2024

(30) Foreign Application Priority Data
Aug. 2, 2021 (CN) .......................... 202121782227.8

(51) Int. Cl.
*B32B 37/06* (2006.01)
*B32B 37/00* (2006.01)

(52) U.S. Cl.
CPC .......... *B32B 37/06* (2013.01); *B32B 37/0053* (2013.01); *B32B 2037/0061* (2013.01)

(58) Field of Classification Search
CPC ...................... B32B 2037/0061; B32B 37/005
See application file for complete search history.

(56) References Cited

U.S. PATENT DOCUMENTS 3,840,420 A * 10/1974 Sarcia ................... B32B 37/185
156/359
5,445,700 A * 8/1995 Uang .................. B32B 37/0053
156/359
(Continued)

FOREIGN PATENT DOCUMENTS

CN 2213621 Y 11/1995
CN 203637291 U 6/2014
(Continued)

*Primary Examiner* — Scott W Dodds
(74) *Attorney, Agent, or Firm* — Justin Lampel

(57) ABSTRACT

The present invention discloses a preheating-free laminator for improving the quality of lamination, comprising a body, a rubber roller set arranged inside the body, and a heating component arranged close to the rubber roller set; a lamination inlet is arranged on the front side of the body; a rubber feeding and pushing component is arranged at the lamination inlet, and the rubber feeding and pushing component and the rubber roller set are coordinated to push the laminated substance successively according to the feeding direction; wherein, the linear speed of the rubber feeding and pushing component is lower than that of the rubber roller set, and the static friction between the rubber roller set and the laminated substance is greater than that between the rubber feeding and pushing component and the laminated substance; when the laminated substance enters the rubber roller set through the rubber feeding and pushing component, there is a static friction fit between the rubber roller set and the laminated substance, and at the same time a sliding friction fit between the rubber feeding and pushing component and the laminated substance, to avoid the laminated substance directly inserted into the rubber roller set, and the plastic sealing treatment is carried out in a tensioned state to improve the quality of lamination.

1 Claim, 4 Drawing Sheets

(56) References Cited

U.S. PATENT DOCUMENTS

2006/0151120 A1\* 7/2006 Matlin ................ B32B 37/0046
  156/583.1
2011/0284146 A1 11/2011 Hirtreiter et al.

FOREIGN PATENT DOCUMENTS

| | | | | |
|---|---|---|---|---|
| CN | 204107763 U | 1/2015 | | |
| CN | 107362936 A | 11/2017 | | |
| CN | 109591433 A | 4/2019 | | |
| EP | 0786334 A2 \* | 1/1997 | ............. | B32B 31/00 |
| GB | 2379905 A \* | 3/2003 | ............. | B32B 37/10 |

\* cited by examiner

PREHEATING-FREE LAMINATOR FOR IMPROVING THE QUALITY OF LAMINATION

TECHNICAL FIELD

The present invention relates to the technical field of laminator, in particular to a preheating-free laminator for improving the quality of lamination.

BACKGROUND ART

The laminator is mainly composed of a drive system, a heating temperature control system, an operation control panel, and front and rear rubber rollers, which is a special equipment for plastic sealing of photos or documents.

The existing temperature-regulating laminator plastic-seals the laminated substance through the pressure- and speed-fixed rubber roller set, and the temperature can be regulated by the heating structure therein. However, the pressure between the rubber rollers and the running speed of rubber rollers have been fixed when leaving the factory, and the plastic sealing temperature can be regulated by users themselves. Generally, a plastic sealing machine heated by the front rubber roller is adopted, and its display temperature is relatively close to the plastic sealing temperature. The operation of this type of machine should be carried out one by one according to the procedures required by the process. When the pressure and speed are constant, if the temperature is too low, the plastic seal will not be firm, and if the temperature is too high, deformation and adhesive overflow will occur. Therefore, it is necessary to improve.

CONTENT OF INVENTION

In view of the shortcomings of the prior art, the purpose of the present invention is to provide a preheating-free laminator for improving the quality of lamination, so that the laminated substance enters the rubber roller set under a tensioned state, so as to avoid wrinkles or wavy lines when the coating is laminated, and improve the quality of lamination.

In order to achieve the above purpose, the technical solution adopted by the present invention is: a preheating-free laminator for improving the quality of lamination, comprising a body, a rubber roller set arranged inside the body, and a heating component arranged close to the rubber roller set; a lamination inlet is arranged on the front side of the body; a rubber feeding and pushing component is arranged at the lamination inlet, and the rubber feeding and pushing component and the rubber roller set are coordinated to push the laminated substance successively according to the feeding direction; wherein, the linear speed of the rubber feeding and pushing component is lower than that of the rubber roller set, and the static friction between the rubber roller set and the laminated substance is greater than that between the rubber feeding and pushing component and the laminated substance; when the laminated substance enters the rubber roller set through the rubber feeding and pushing component, there is a static friction fit between the rubber roller set and the laminated substance, and at the same time a sliding friction fit between the rubber feeding and pushing component and the laminated substance.

Compared with the prior art, the advantages of the present invention are as follows: The present invention provides a preheating-free laminator for improving the quality of lamination; it is avoided that the laminated substance is directly inserted into the rubber roller set by arranging a rubber feeding and pushing component at the lamination inlet, and the laminated substance can be maintained in a tensioned state when inserted into the rubber roller set by forming a linear speed difference between the rubber feeding and pushing component and the rubber roller set, so as to avoid undesirable effects such as wrinkles or wavy lines on the laminated substance, and further improve the quality of lamination; a lamination sliding structure is arranged in the rubber feeding and pushing component to achieve slippage between the laminated substance and the rubber feeding and pushing component, so as to avoid slippage between the laminated substance and the rubber roller set, and ensure the smooth completion of plastic sealing.

DETAILED DESCRIPTION OF EMBODIMENTS

Figure 1:
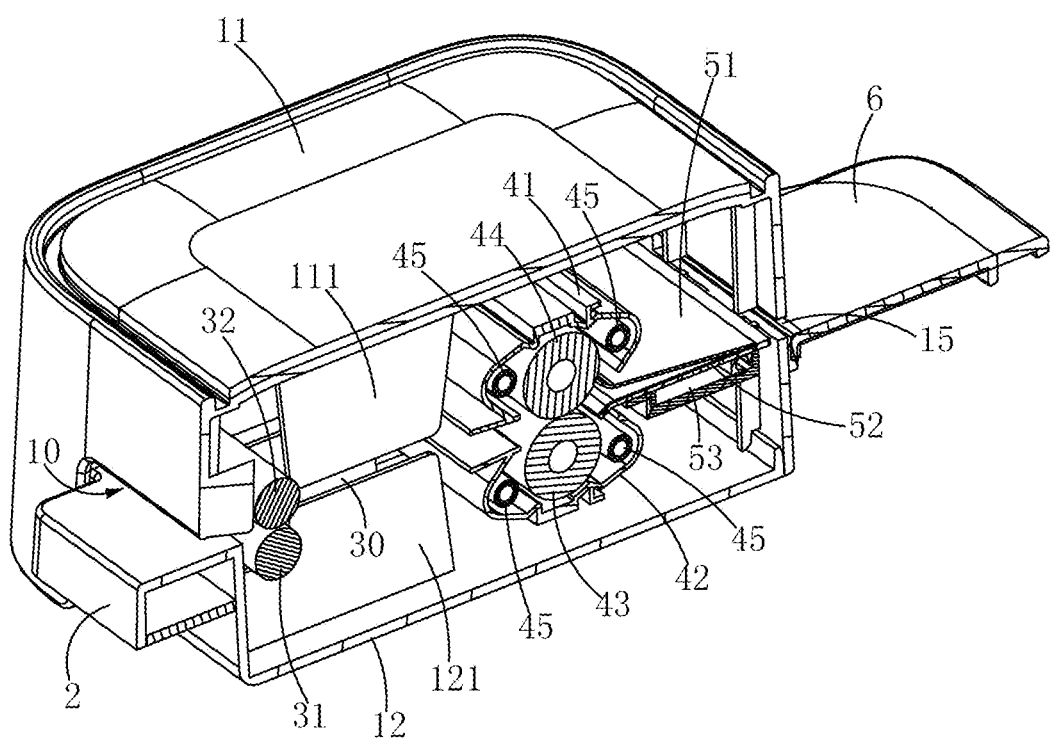
FIG. 1 is a cross-sectional schematic diagram of the present invention.
Figure 2:
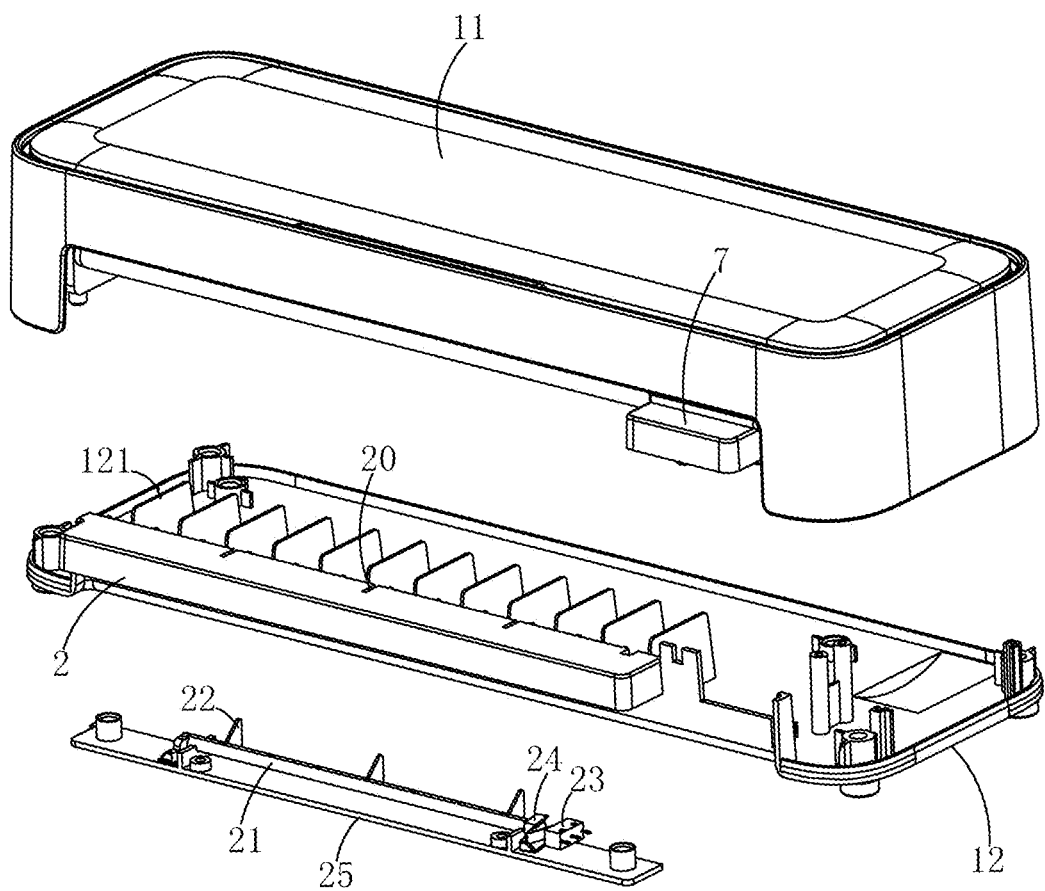
FIG. 2 is a decomposition schematic diagram of the present invention.
Figure 3:
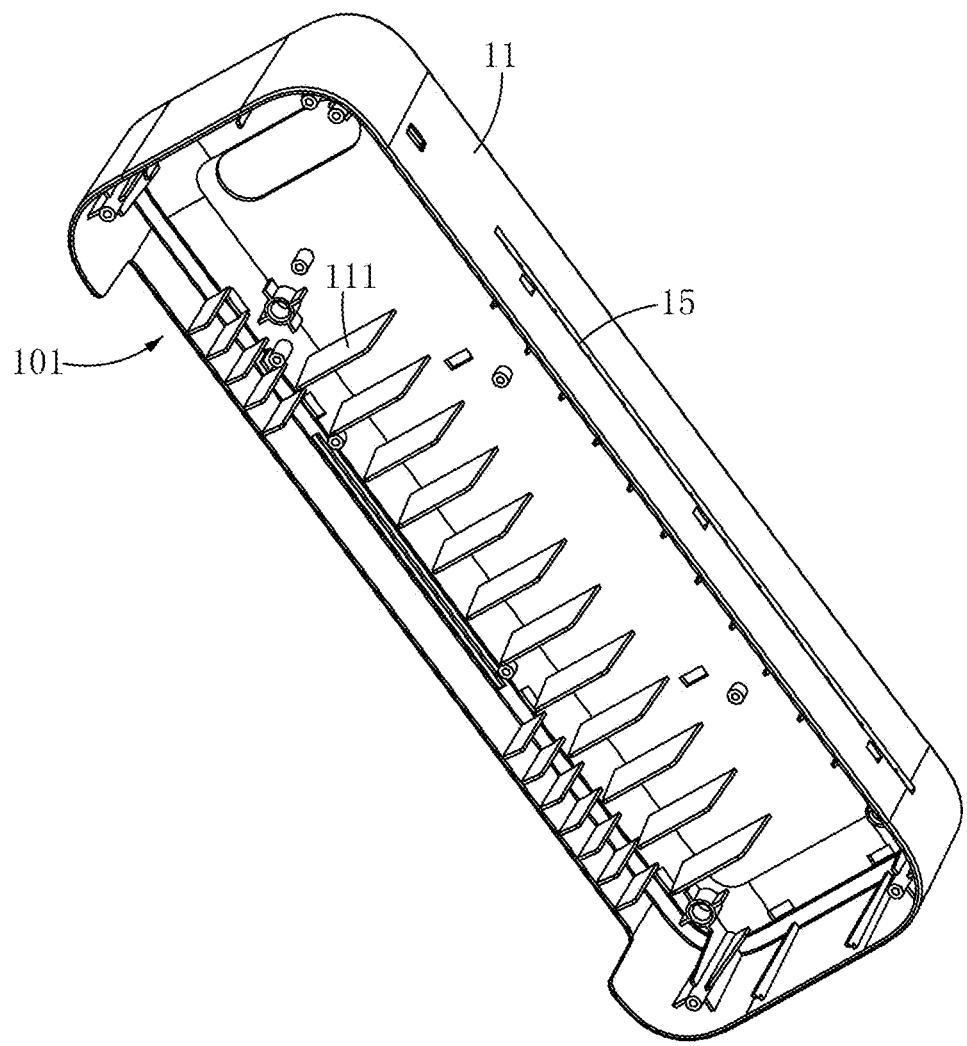
FIG. 3 is a structural schematic diagram of the upper case in the present invention.
Figure 4:
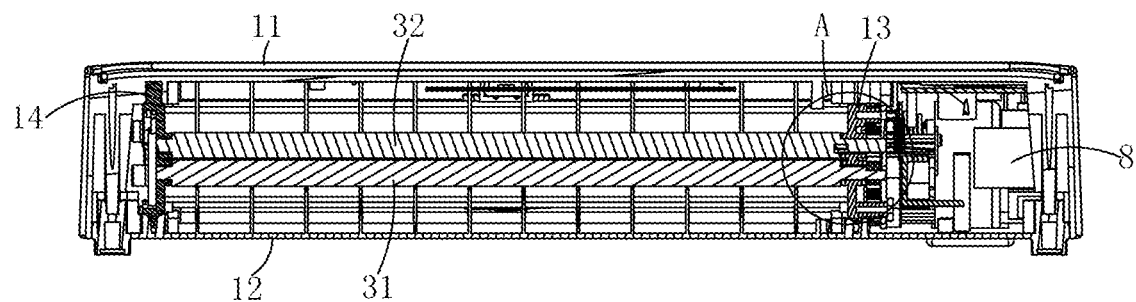
FIG. 4 is a cross-sectional schematic diagram from another angle of the present invention.
Figure 5:
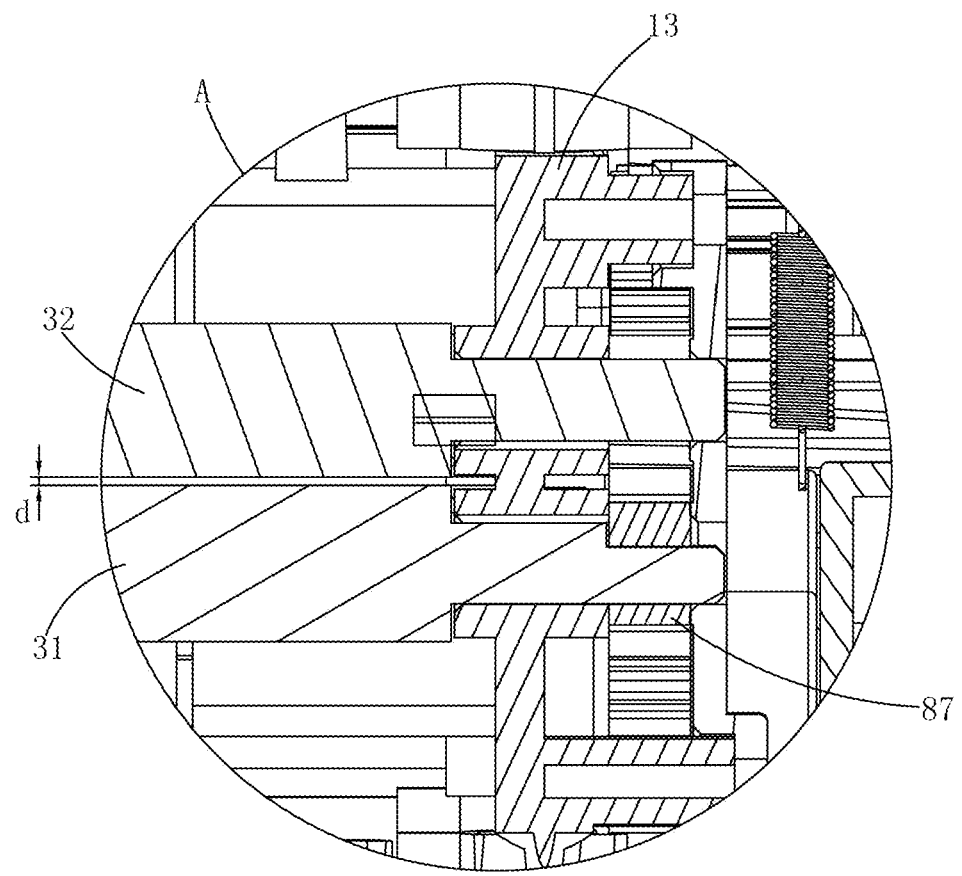
FIG. 5 is an enlarged view of A in FIG. 4.

A preheating-free laminator for improving the quality of lamination, as shown in FIGS. 1 to 5, comprising a body, a rubber roller set arranged inside the body, and a heating component arranged close to the rubber roller set; a lamination inlet 10 is arranged on the front side of the body; a rubber feeding and pushing component is arranged at the lamination inlet 10, and the rubber feeding and pushing component and the rubber roller set are coordinated to push the laminated substance successively according to the feeding direction; wherein, the linear speed of the rubber feeding and pushing component is lower than that of the rubber roller set, and the static friction between the rubber roller set and the laminated substance is greater than that between the rubber feeding and pushing component and the laminated substance; when the laminated substance enters the rubber roller set through the rubber feeding and pushing component, there is a static friction fit between the rubber roller set and the laminated substance, and at the same time a sliding friction fit between the rubber feeding and pushing component and the laminated substance. It is avoided that the laminated substance is directly inserted into the rubber roller set by arranging a rubber feeding and pushing component at the lamination inlet, and the laminated substance can be maintained in a tensioned state when inserted into the rubber roller set by forming a linear speed difference between the rubber feeding and pushing component and the rubber roller set, so as to avoid undesirable effects such as wrinkles or wavy lines on the laminated substance, and further improve the quality of lamination. The principle is as follows: The laminated substance is inserted through the lamination inlet 10, and is fed to the rubber roller set under the roller feeding and pushing action of the rubber feeding and pushing component; after the laminated substance is inserted into the rubber roller set, since the linear speed of the rubber roller set is greater than that of the rubber feeding and pushing component, the feeding speed is increased under the feeding and pushing action of the rubber roller set when the laminated substance passes through the rubber roller set, and is greater than the linear speed of the rubber feeding and pushing component; therefore, a sliding friction fit occurs between the rubber feeding and pushing component and the laminated substance, and the laminated substance enters the rubber roller set in a tensioned state, so as to achieve the purpose of improving the quality of lamination.

The rubber feeding and pushing component comprises one of a conveying roller structure, a conveying belt structure or a roller conveying chain structure. The rubber feeding and pushing component should meet the functional effect of feeding and pushing the laminated substance and coating from the lamination inlet 10 to the rubber roller set, and should meet the requirement that the maximum static friction between the feeding and pushing surface of the rubber feeding and pushing component and the coating is less than that between the rubber roller set and the coating, so as to achieve the technical purpose of lamination feeding and pushing and coat tightening. Therefore, the rubber feeding and pushing component should not be limited to the conveying roller structure, but also a conveying structure such as a conveyor belt structure or a roller conveying chain structure.

The rubber feeding and pushing component adopts a conveying roller structure, the conveying roller structure comprises a rubber feeding roller set comprising an active rubber feeding roller 31 and a passive rubber feeding roller 32 which are arranged parallel to each other, and the active rubber feeding roller 31 is connected with a feed drive device in transmission; the active rubber feeding roller 31 and the passive rubber feeding roller 32 comprise a metal roller respectively; the roller surfaces of these two metal rollers are smoothly arranged, and there is a lamination sliding structure between the two metal rollers; the lamination sliding structure comprises any one of a roller surface clearance structure and an elastic roller set structure; wherein, in the roller surface clearance structure, a rubber feeding clearance d is formed between the roller surface of the active rubber feeding roller 31 and the roller surface of the passive rubber feeding roller 32, and the rubber feeding clearance d is less than the thickness of the laminated substance; and in the elastic roller set structure, the roller surface of the active rubber feeding roller 31 and the roller surface of the passive rubber feeding roller 32 are movably fitted with each other by abutting, both ends of the passive rubber feeding roller 32 are respectively connected with an elastic structure, and the passive rubber feeding roller 32 is used for elastic floating fit in the up and down directions.

For example, a roller surface clearance structure is selected, and its rubber feeding clearance d is preferably 0.2 cm to 0.5 cm. The technical principle is as follows: Due to the arrangement of the roller surface clearance structure, the force in the vertical direction that the laminated substance receives when the active rubber feeding roller 31 and the passive rubber feeding roller 32 pass is less than that of the rubber roller set on the laminated substance. According to the friction theorem, the friction force is proportional to the positive pressure. Therefore, when the laminated substance passes through the rubber feeding roller set and the rubber roller set at the same time, the static friction force between the laminated substance and the rubber feeding roller set is less than that between the laminated substance and the rubber roller set, and the linear speed of the rubber roller set is greater than that of the rubber feeding roller set, and thus a sliding friction fit occurs between the laminated substance and the rubber feeding roller set.

A first side plate 13 and a second side plate 14 parallel to each other are respectively fixed on the left and right sides of the inside of the body, the active rubber feeding roller 31 and the passive rubber feeding roller 32 are rotatably mounted between the first side plate 13 and the second side plate 14 through bearings respectively, the active rubber feeding roller 31 is aligned up and down with the passive rubber feeding roller 32, the rubber feeding clearance d is formed between the roller surface of the active rubber feeding roller 31 and the roller surface of the passive rubber feeding roller 32, and the rubber feeding clearance d is horizontally aligned with the lamination inlet 10; the end of the active rubber feeding roller 31 is coaxially mounted with a rubber feeding roller gear 87, and the active rubber feeding roller 31 is connected to the feed drive device through the rubber feeding roller gear 87 in transmission.

The first side plate 13 and the second side plate 14 are respectively arranged with movable bearing seats that move up and down synchronously; these two movable bearing seats are arranged in horizontal alignment, and there is an adjusting nut in the transmission connection; both ends of the passive rubber feeding roller 32 are respectively assembled on these two movable bearing seats, and the passive rubber feeding roller 32 is adjusted in height by manually twisting the adjusting nut to realize the size adjustment of the rubber feeding clearance d. It is applicable to plastic sealing process of different thicknesses of laminated substances by arranging an adjustable rubber feeding roller set, alternatively, the tension of the laminated substance is adjusted to achieve the optimal lamination effect.

The front side of the body is arranged with a rubber feeding pallet 2, a rubber feeding trigger shaft 21 is rotatably mounted inside the rubber feeding pallet 2, and a torsion spring is connected between the rubber feeding trigger shaft 21 and the rubber feeding pallet 2; the rubber feeding trigger shaft 21 is arranged with multi-axially aligned trigger fins 22 at intervals along its axis, and each trigger fin 22 respectively protrudes from the surface of the rubber feeding pallet 2 and movably blocks the lamination inlet 10; a micro switch 23 is connected to the end of the rubber feeding trigger shaft 21 for triggering, and the micro switch 23 is electrically connected to the feed drive device and the heating component.

A trigger block 24 is fixedly connected to the end of the rubber feeding trigger shaft 21, and the trigger block 24 rotates as the rubber feeding trigger shaft 21 rotates; the micro switch 23 is fixed on the bottom shell 25 of the rubber feeding pallet 2; during rubber feeding, the laminated substance pushes each trigger fin 22 and drives the rubber feeding trigger shaft 21 to rotate, and the trigger block 24 rotates and triggers the contact piece abutted against the micro switch 23 to complete the triggering.

The body comprises an upper case 11 and a lower case 12 assembled and connected to each other, a plurality of upper fins 111 arranged at intervals are formed inside the front side of the upper case 11, a plurality of lower fins 121 arranged at intervals are formed inside the front side of the lower case 12, and the upper fins 111 and the lower fins 121 are respectively aligned or staggered; the bottom surface of each upper fin 111 is horizontally aligned to form a channel top surface, and the top edge of each lower fin 121 is horizontally aligned to form a channel bottom surface; when the upper case 11 and the lower case 12 are assembled and connected, the channel top surface and the channel bottom surface are combined to form a rubber feeding channel 30, and the rubber feeding roller set and the rubber roller set are respectively located at the openings on the front and rear sides of the rubber feeding channel 30.

A rubber feeding notch 101 is arranged at the front side recess of the upper case 11; when the upper case 11 and the lower case 12 are assembled and connected, the rubber feeding notch 101 and the rubber feeding pallet 2 are combined to form a lamination inlet; a lamination outlet 15 is arranged at the rear side of the upper case 11.

The inside of the body is arranged with a movement assembly, comprising an upper core shell 41 and a lower core shell 42, which are inserted between the first side plate 13 and the second side plate 14, respectively; the rubber roller set comprises an upper pressing roller 44 and a lower pressing roller 43 arranged in parallel up and down; the roller surface of the upper pressing roller 44 and the roller surface of the lower pressing roller 43 are movably fitted by abutting, the roller surfaces of the upper pressing roller 44 and the lower pressing roller 43 are respectively arranged in soft laminations, and high-temperature resistant silicone roller surfaces are selected; the upper and lower pressing rollers 44 and 43 are respectively arranged with heating tubes 45 on the front and rear sides; there is a thermal radiation interval between the heating tube 45 and the pressing roller, which increases the thermal radiation rates of the upper pressing roller 44 and the lower pressing roller 43, increases the heating rates of the upper pressing roller 44 and the lower pressing roller 43, and reduces the preheating time.

A lamination leveling mechanism 5 is arranged between the lamination outlet 15 and the rubber roller set; the lamination leveling mechanism 5 comprises a leveling bottom plate 52 and a leveling pressure plate; the leveling pressure plate 51 is elastically mounted on the top of the leveling bottom plate 52, and the leveling pressure plate 51 is arranged to be inclined downward along the feeding direction of the laminated substance; a leveling channel that gradually converges from the inside to the outside is formed between the leveling bottom plate 52 and the leveling pressure plate 51; the inner opening of the leveling channel is connected to the rubber roller set, and the outer opening is connected to the lamination outlet 15; the bottom of the leveling pressure plate 51 is arranged with a temperature compensation heating device 53, and the temperature compensation heating device 53 is electrically connected to the micro switch 23.

A rubber delivery pallet 6 is also arranged at the lamination outlet 15 of the body; the rubber delivery pallet 6 is movably connected to the body, and a limit structure is arranged between the rubber delivery pallet 6 and the body; the surface of the rubber delivery pallet 6 and the lamination outlet 15 are arranged flush, leaving a plane supporting effect on the softer laminated substance with a higher rubber delivery temperature, so as to avoid bending and shaping of the laminated substance under the action of gravity, thereby affecting the quality of lamination. The rubber delivery pallet 6 can be a split design or a rotary folding design, which has the advantage of facilitating storage.

A drive motor 8 is installed inside the body, and the drive motor 8 is respectively connected to the rubber feeding roller set and the rubber roller set in transmission; a clutch handle 7 is movably installed in the body, and the end of the clutch handle is movably connected to the output shaft of the drive motor 8. It is used to stop each roller set in time in case of a lamination accident, and it is convenient to quickly pull out the laminated substance to avoid damage to the laminated substance.

The invention claimed is:

1. A preheating-free laminator for improving the quality of lamination, comprising a body, a rubber roller set arranged inside the body, and a heating component arranged close to the rubber roller set; a lamination inlet (10) is arranged on a front side of the body, wherein: a rubber feeding and pushing component is arranged at the lamination inlet (10), and the rubber feeding and pushing component and the rubber roller set are coordinated to push a laminated substance successively according to a feeding direction;

wherein, a linear speed of the rubber feeding and pushing component is lower than that of the rubber roller set, and the static friction between the rubber roller set and the laminated substance is greater than that between the rubber feeding and pushing component and the laminated substance; when the laminated substance enters the rubber roller set through the rubber feeding and pushing component, there is a static friction fit between the rubber roller set and the laminated substance, and at the same time a sliding friction fit between the rubber feeding and pushing component and the laminated substance;

wherein the rubber feeding and pushing component are a rubber feeding roller set comprising an active rubber feeding roller (31) and a passive rubber feeding roller (32) which are arranged parallel to each other, and the active rubber feeding roller (31) is connected with a feed drive device; the active rubber feeding roller (31) and the passive rubber feeding roller (32) each comprise a metal core that is coated in rubber;

the rubber feeding roller set is arranged with a lamination sliding structure between the active rubber feeding roller (31) and the passive rubber feeding roller (32); the lamination sliding structure comprises one or both of a roller surface clearance structure or an elastic roller set structure;

in the roller surface clearance structure, a rubber feeding clearance d is formed between a roller surface of the active rubber feeding roller (31) and a roller surface of the passive rubber feeding roller (32), the rubber feeding clearance d is horizontally aligned with the lamination inlet (10), the passive rubber feeding roller (32) is adjusted in height by manually twisting an adjusting nut to adjust the size of the rubber feeding clearance d; and the rubber feeding clearance d is less than the thickness of the laminated substance; and in the elastic roller set structure, the roller surface of the active rubber feeding roller (31) and the roller surface of the passive rubber feeding roller (32) are abutting, wherein both ends of the passive rubber feeding roller (32) are respectively connected with an elastic structure to enable an elastic floating fit in the up and down directions;

wherein a first side plate (13) and a second side plate (14) are respectively fixed parallel to each other on left and right sides of the inside of the body, the active rubber feeding roller (31) and the passive rubber feeding roller (32) are rotatably mounted between the first side plate (13) and the second side plate (14) through bearings respectively, the active rubber feeding roller (31) is aligned up and down with the passive rubber feeding roller (32); the end of the active rubber feeding roller (31) is coaxially mounted with a rubber feeding roller gear (87), and the active rubber feeding roller (31) is connected to the feed drive device through the rubber feeding roller gear (87);

wherein the first side plate (13) and the second side plate (14) are respectively arranged with movable bearing seats that move up and down synchronously; the movable bearing seats are arranged in horizontal alignment; both ends of the passive rubber feeding roller (32) are respectively assembled on these two movable bearing seats;

wherein the front side of the body is arranged with a rubber feeding pallet (2), a rubber feeding trigger shaft (21) is rotatably mounted inside the rubber feeding pallet (2), and a torsion spring is connected between the rubber feeding trigger shaft (21) and the rubber feeding pallet (2); the rubber feeding trigger shaft (21) is arranged with multi-axially aligned trigger fins (22) at intervals along its axis, and each trigger fin (22) respectively protrudes from the surface of the rubber feeding pallet (2) and movably blocks the lamination inlet (10); a micro switch (23) is connected to the end of the rubber feeding trigger shaft (21) for triggering, and the micro switch (23) is electrically connected to the feed drive device and the heating component;

wherein the body comprises an upper case (11) and a lower case (12) assembled and connected to each other, a plurality of upper fins (111) arranged at intervals are formed inside the front side of the upper case (11), a plurality of lower fins (121) arranged at intervals are formed inside the front side of the lower case (12), and the upper fins (111) and the lower fins (121) are respectively aligned or staggered; the bottom surface of each upper fin (111) is horizontally aligned to form a channel top surface and the top edge of each lower fin (121) is horizontally aligned to form a channel bottom surface to form a rubber feeding channel (30) therebetween, and the rubber feeding and pushing component and the rubber roller set are located at openings on the front and rear sides respectively of the rubber feeding channel (30);

wherein a notch (101) is in the front side of the upper case (11); when the upper case (11) and the lower case (12) are assembled and connected, the notch (101) and the rubber feeding pallet (2) are combined to form the lamination inlet; a lamination outlet (15) is arranged at the rear side of the upper case (11);

wherein a lamination leveling mechanism (5) is arranged between the lamination outlet (15) and the rubber roller set; the lamination leveling mechanism (5) comprises a leveling bottom plate (52) and a leveling pressure plate (51); the leveling pressure plate (51) is mounted on the top of the leveling bottom plate (52), and the leveling pressure plate (51) is arranged to be inclined downward along the feeding direction of the laminated substance; a leveling channel that gradually converges from an inner opening to an outer opening is formed between the leveling bottom plate (52) and the leveling pressure plate (51); the inner opening of the leveling channel is connected to the rubber roller set, and the outer opening is connected to the lamination outlet (15); a bottom of the leveling pressure plate (51) is arranged with a temperature compensation heating device (53), and the temperature compensation heating device (53) is electrically connected to the micro switch (23).

* * * * *